Patented July 13, 1954

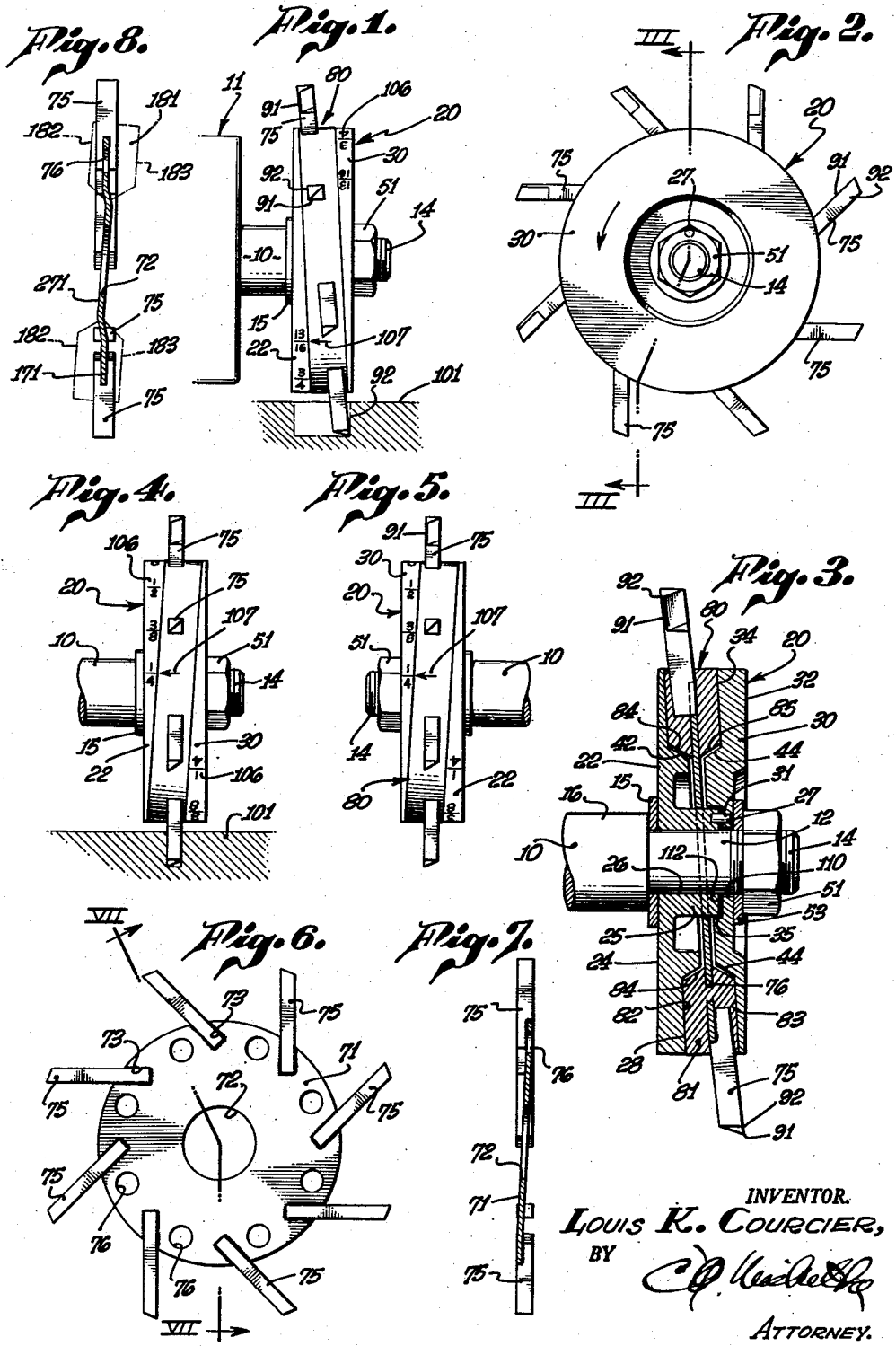

2,683,476

UNITED STATES PATENT OFFICE 2,683,476

ADJUSTABLE ROTARY DADO CUTTING TOOL

Louis K. Courcier, Glendale, Calif.

Application December 22, 1950, Serial No. 202,272

3 Claims. (Cl. 144—238)

This invention is a continuation-in-part of my application Serial Number 778,573, filed October 8, 1947, and now abandoned, and relates generally to a tool for milling a groove in a work piece and particularly to such a tool adjustable to cut a groove of any desired width within the range of the tool.

Devices proposed for this purpose in the past have generally taken the form of a conventional rotary saw blade mounted upon a special hub. By manipulation of such a hub, the inclination of the saw blade may be varied from a plane perpendicular to the shaft axis to a plane oblique thereto.

Devices such as those just referred to were never entirely satisfactory in operation, principally for the reason that the width of groove cut by such a saw varied with the hardness of the work piece, the speed of feeding the work piece to the saw, the speed at which the saw was rotated and the degree of fatigue created within the body of the saw by prior use thereof. Despite these disadvantages the prior devices have been used with their imperfections since no better solution was available.

With the advent of high speed saws, however, the prior devices proved not only more unsatisfactory in milling a groove having a desired width but moreover were dangerous in operation because of internal stresses set up within the body of the saw at high speeds of rotation. For this reason the so-called "wobble saw" has been disapproved by safety organizations and insurance companies.

My invention overcomes the above shortcomings of prior devices and has for its principal object the disclosure of a novel cutting tool for grooving a work piece.

Another object of my invention is to provide such a tool having a cutting head of novel construction.

A further object is to provide a dadoing tool inherently having excellent dynamic balance at high speeds of rotation.

A still further object is to provide a cutting tool capable of being adjusted to cut a groove of any desired width within the range of the tool.

Another object is to disclose such a cutting tool having cutting bits arranged in two series on the cutting head, the cutting edges of each series lying in a common plane.

A further object is to disclose such a tool which is reversible end for end whereby it may be used on either a right or left hand shaft.

Still another object of the invention is to disclose such a device which is extremely rugged and durable in construction and yet comparatively inexpensive to manufacture.

These and other objects and purposes of the invention become apparent from a study of the following description of a typical embodiment thereof taken in connection with the accompanying drawing in which:

Fig. 1 is a side elevational view of a cutting tool in accordance with my invention carried upon a rotatable shaft, the tool being set for forming a groove of maximum width.

Fig. 2 is an end view of the device shown in Fig. 1.

Fig. 3 is a sectional view taken on line III—III of Fig. 2.

Figs. 4 and 5 are side elevational views of my cutting tool adjusted for cutting a groove of minimum width in a work piece and mounted, respectively, on shafts having right hand and left hand extensions.

Fig. 6 is a plan view of the core plate or spider and the bits carried thereby.

Fig. 7 is a sectional view taken on line VII—VII of Fig. 6.

Fig. 8 is a sectional view similar to Fig. 7 showing a modified construction of the core plate and bits, the die cast cutter head being shown in dotted outline.

Generally speaking, my invention contemplates a cutter head having a plurality of co-planar cutting bits projecting therefrom. There are an even number of said cutting bits in accordance with my invention and they consist of two series of bits, the cutting edges of the bits of the two series defining and lying in a pair of spaced parallel planes. In the construction of my cutting head a core plate or spider of relatively thin metal is provided with a plurality of notches into each of which a cutting bit may be received. The spider is preferably formed of steel and the cutting bits, as is customary, are made of tool steel. The cutting bits are retained in the spider by suitable means, such as silver brazing, which is advantageous in that the brazing process may be carried out at relatively low temperatures whereby the temper of the tool steel of the cutting bits is not adversely affected.

In one form of my invention, the plane in which the core plate lies is slightly inclined relative to the plane of the cutting bits themselves. Metal, preferably aluminum, is then die cast around the assembly just described, the die cast metal assuming an annular shape with planar side walls extending parallel to the plane of the core plate or spider. Cutting edges are then provided on the bits and means are provided for clamping and retaining the cutter head assembly so that the plane of the cutting bits assumes any desired angular inclination relative to the axis of the shaft on which the cutter is carried. In a modified form of the invention, the plane of the major portion of the core plate is parallel to the plane of the cutting bits instead of being inclined thereto, and a small central annular portion of the core plate is deformed for reasons hereafter to be apparent. This latter construction is particularly applicable in cutting heads of relatively large diameter, say ten inches and greater.

Referring now in detail to the drawing and particularly to Fig. 1 thereof, a shaft 10 is carried in a motor driven tool indicated generally at 11 and is provided with a portion 12 of reduced diameter (see Fig. 3) terminating in a threaded end 14. My cutting tool, indicated generally at 20, is carried upon reduced portion 12 of shaft 10. A washer 15 abuts the shoulder 16 of shaft 10 and an internal clamping disc 22 is carried on reduced portion 12 of shaft 10 adjacent washer 15.

Clamping disc 22 has an external face 24 extending perpendicularly from bore 26, and an inclined annular face 28. An external clamping disc 30 is provided with an outer face 32 extending perpendicular to the axis of shaft 10 and has an inner annular face 34 which is inclined to the axis of shaft 10 at the same angle as the inner face 28 of internal clamping disc 22.

The inner annular face 28 of clamping disc 22 terminates in an inclined annular shoulder 42 which is frusto-conical in shape. Similarly the inner annular face 34 of clamping disc 30 terminates in an inclined annular shoulder 44, likewise frusto-conical.

Internal clamping disc 22 includes an axially extending collar 25, the inner diameter of which is equal, within customary tolerance, to the diameter of reduced portion 12 of shaft 10 and constitutes the bore 26 previously referred to. An annular shoulder or rabbet 35 formed in clamping disc 30 receives and is supported by the end portion of collar 25, and a keying or locking pin 27 projects axially from collar 25 and is received in aperture 31 formed in clamping disc 30. Thus the two clamping discs 22 and 30 are mutually stationary when this device is assembled. A nut 51 is carried by the threaded end 14 of shaft 10 and serves to retain the assembly in the relationship shown in Fig. 3. A lock washer 53 is preferably included and performs its conventional function.

The construction of my cutter head will now be described with particular reference to Figs. 6 and 7. A circular core plate or spider 71 is provided with a central aperture 72. The diameter of the aperture 72 is slightly greater than the outside diameter of collar 25 of clamping disc 22 since, as appears in Fig. 3, the core plate 71 will be canted when mounted upon collar 25. Equally spaced about the periphery of core plate 71 are a number of recesses 73 having parallel sides and a bottom perpendicular to the sides, and each recess 73 receives a cutting bit 75 having the shape of a truncated rectangular parallelepipedon. As best appears in Figs. 3 and 7, the plane defined by core plate 71 is angularly inclined relative to the plane of cutting bits 75. With the parts thus positioned the cutting bits 75 are brazed to core plate 71. I preferably silver braze the bits 75 since by this means the brazing may be done at a relatively low temperature and the temper of cutting bits 75 is thereby substantially unaffected. In the practice of my invention, it is necessary that an even number of bits be provided, and it will be understood that although eight are shown in the present illustration, 10, 12 or even more could be used if desired. Between each pair of adjacent bits 75 core plate 71 is provided with an aperture 76. These apertures are here shown as circular, but they may assume any desired shape since their function is to permit die cast metal to flow through and around them and this to form an integral cutter head.

The cutter head is formed by casting metal, preferably aluminum, around said core plate and cutting bits as appears in Fig. 3. In the embodiment of my invention shown in Fig. 7, metal 81 thus cast on core plate 71 is applied to an equal thickness on either side of the core plate, and forms the major portion of the body of the assembled cutter head indicated generally at 80. The cutter head 80 is provided with annular side walls 82 and 83 lying in parallel planes, and the inner circumference of said side walls 82 and 83 terminate in annular frusto-conical shoulders 84 and 85 respectively. It will be noted that the die cast metal 81 occupies apertures 76 so that following the die casting operation the entire cutter head assembly 80 constitutes a rigid structure, with the plane of cutting bits 75 being angularly inclined relative to side walls 82 and 83 of the cutter head 80.

The cutting bits 75 are ground so that each bit is provided with a cutting edge 91 and an outer face 92 trailing cutting edge 91. Faces 92 may be provided with a very small angular clearance in accordance with common practice. In the illustrated embodiment including eight cutting bits 75, I provide a series of four successive bits whose cutting edges 91 lie in a common plane. The remaining four successive bits have cutting edges 91 which also define a common plane, the two planes being spaced apart by the thickness of one of the cutting bits 75.

Comparison of Figs. 1 and 4 will clearly show the adjustability of the present invention. In Fig. 1 the cutter head 80 has been rotated so that the angular inclination between the cutting bits 75 and the side walls 82 and 83 of cutter head 80 is added to the obliquity previously described of inner faces 28 and 34 of clamping discs 22 and 30 respectively. Thus the device as adjusted in Fig. 1 will cut a groove in work piece 101 having maximum width. On the other hand, after nut 51 is loosened and cutter head 80 rotated so that the parts assume the position shown in Fig. 4, the cutter will mill a groove of minimum width, this width being substantially the thickness of one of the bits 75. Similarly a groove having any desired width between the maximum and the minimum may be milled by properly adjusting cutter head 80 in its angular relationship with clamping discs 22 and 30. It will be noted that the position of the parts shown in Fig. 4 is such that the angular inclination between bits 75 and side walls 82 and 83 of cutter head 80 exactly compensates for the inclination of the cutter head 80 caused by the inclined inner faces 28 and 34 of the clamping discs. Thus the plane of bits 75 in the position of Fig. 4 is perpendicular to the axis of shaft 10.

I preferably provide a calibrated scale 105 on the outer cylindrical surface of clamping discs 22 and 30, as appears in Figs. 1, 4 and 5. An indicating mark 107, preferably in the form of an arrow, is carried on the outer surface of cutter head 80 and is positioned to accurately indicate the width of groove which the tool will cut at any setting. Both clamping discs are provided with the calibrated scale 106 in order that my tool may be used on either leftwardly or rightwardly projecting shafts. Thus only one indicating arrow 107 is carried on cutter head 80 and the possibility of erroneously setting the tool is substantially eliminated.

The cutting bits 75 are preferably inclined forwardly in the direction of rotation as shown in Figs. 2 and 6, each cutting bit therefore forming a chord of core plate 71.

With further reference to Fig. 3, it is to be noted that the external clamping disc 30 is preferably formed so that it does not contact the reduced portion 12 of shaft 10, the inner diameter 110 of clamping disc 30 being slightly larger than the diameter of the reduced portion 12. Furthermore, the inner annular surface 112 of clamping disc 30 immediately adjacent inner diameter 110 is slightly spaced from the annular end of collar 25 so that it is certain that the cutter head 80 will be securely gripped by inclined faces 28 and 34 of the clamping discs when nut 51 is tightened.

Other constructional features of my invention appear in Fig. 3. It will be obvious that cutter head 80 must be held accurately concentric with shaft extension 12 so that the device will have good dynamic balance at high speed. In order to accomplish this, the cutter head may be centered by complementary engagement of frustoconical shoulders 84 and 85 with frusto-conical shoulders 42 and 44. I prefer, however, to form cutter head 80 so that these shoulders are spaced apart out of touching engagement, as is clearly shown in Fig. 3, and to rely upon the fit between inner diameter 72 of core plate 71 and the outer diameter of collar or hub 25 to retain cutter head 80 in concentric relation with shaft extension 12. Since the core plate is canted slightly on the collar, it will be understood that inner diameter 72 must be somewhat greater than the outer diameter of collar or hub 25 so that the core plate does not bind thereon.

In Fig. 8 is shown an alternative form of construction of the core plate and bits. As there illustrated, core plate 171 is identical to core plate 71 previously described except that an annular area 271 immediately surrounding inner diameter 72 is deformed so that such deformed portion 271 lies in a plane angularly displaced from the remaining major portion of core plate 171. As will be observed, the die-cast aluminum 181, shown in dotted outline, assumes the same shape as indicated at 81 in Fig. 3, and side walls 182 and 183 lie in planes parallel to the plane defined by annular deformed portion 271 of core plate 171.

The construction just described in connection with Fig. 8 is particularly applicable in the design of relatively large cutter threads; i. e., those having diameters of, say, eight to ten inches and greater. It will be noted in Fig. 8 that the outer diameter of core plate 171 may be as large as desired, whereas the construction of Fig. 7 (for given widths of core plate and cutting bit and a given angular inclination between the core plate and the plane of the cutting bits) limits the outer diameter of core plate 71 to that shown.

It is important that in either construction of the core plate, the annular portion immediately adjacent inner diameter 72 thereof must lie in a plane parallel to that of each of the annular side walls of the die cast metal 81 or 181. If this parallelism were not maintained, the cutter head could not be held accurately in concentric relation with collar or hub 25 throughout the entire range of adjustment of the tool, since the core plate would bind at some points and be objectionably loose at other points. The necessity of parallelism will be seen to be important also in achieving the reversibility feature of my invention, as illustrated by Figs. 4 and 5.

It will be readily realized that the centering of cutter head 80 relative to shaft extension 12 could also be accomplished by forming clamping disks 22 and 30 of cutter head 80 in such a way that inclined annular shoulders 42 and 44 of the clamping disks slidably engage the complementary shoulders 84 and 85 of cutter head 80. As previously stated, and principally for reasons of manufacturing efficiency, I prefer to achieve concentricity by engagement of inner diameter 72 with collar or hub 25. In addition, when clamping disks 22 and 30 are made of aluminum, as I prefer, I have found that there is a tendency of the die cast aluminum cutter head 80 to adhere or stick to the aluminum clamping disks, and there is a resultant inconvenience in shifting cutter head 80 from one position to another within its range of adjustment.

It will now be seen that I have provided a milling cutter which may be adjusted to dado a groove of any desired width in a work piece. The construction of the tool is such that it is exceptionally strong and rugged. Stresses upon cutting bits 75 in radial and circumferential directions are transmitted directly or through shearing stress of the brazing material to the steel core plate 71 or 171, and thence through collar or hub 25 to shaft extension 12. Stresses upon the cutting bits in a lateral direction are taken through the brazing material and core plate to the aluminum die cast metal 81 in the cutter head proper, and transmitted thereby to the clamping disks 22 and 30. It is imperative in such a tool as the present invention that great lateral rigidity be provided, since otherwise the width of groove cut in the work piece will vary with the speed of rotation of the shaft, the speed of feeding work to the tool, the hardness of the work, and other factors. This objectionable variation of groove width is virtually eliminated by my invention because of the exceptional lateral rigidity inherent in the construction herein disclosed.

It will be apparent to those skilled in the art that certain modifications and changes may be made from the specific forms shown and described. For example the cutting bits need not all lie in the same plane; each of the two series of bits may define a common plane, whereby all bits lie in a pair of spaced parallel planes. The annular side walls of cutter head 80 and the complementary engaging side walls 28 and 34 of clamping disks 22 and 30 respectively may be slightly roughened, gnarled or provided with many very fine radial serrations to insure that cutter head 80 does not rotate between the clamping disks once lock nut 51 has been tightened, although I have found that frictional engagement between these surfaces is sufficient to retain the tool in the position for which set.

All such modifications and changes within the spirit of the present invention are intended to be included within the scope of the following claims.

I claim:

1. A rotatable cutter head for dadoing a groove in a workpiece comprising: a circular, relatively thin, centrally apertured metallic core plate having a plurality of angularly spaced apertures therethrough and a plurality of circumferentially spaced, inwardly directed recesses formed in the peripheral edge thereof; an outwardly projecting cutting bit in each said recess and fixed to said core plate, said cutting bits consisting of two consecutive series of bits, each bit having a cutting edge, the cutting edges of each series being coplanar and disposed on the side of the bits opposite that of the other series as viewed radially of the cutter head, said cutting edges defining a pair of parallel planes; an integral, relatively thick, annular body portion of light metal enveloping the outer portion of the core plate and the inner ends of the bits and extending through said angularly spaced apertures, said body portion having a pair of spaced side walls substantially equally spaced from said core plate and lying in parallel planes slightly inclined to said first pair of parallel planes; and means for positioning and clamping said core plate within the cutter head at a selected inclination with respect to the axis of rotation of said cutter head.

2. A tool rotatable about an axis for milling a groove in a workpiece comprising: a cutter head provided with a circular, relatively thin, metallic planar core plate having a plurality of angularly spaced apertures therethrough and a plurality of circumferentially spaced inwardly directed recesses formed in the peripheral edge thereof, an outwardly projecting cutting bit in each recess fixed to said core plate, said cutting bits being of substantially greater thickness than the core plate, said bits consisting of two consecutive series of bits, the cutting edges of said two series being equally inclined relative to said core plate and those of one series being disposed on the sides of the bits opposite to those of the other series as viewed radially of the head, and an integral, relatively thick annular body of light low melting point metal enveloping the outer peripheral portion of the core plate and the inner portions of the cutting bits and extending through said apertures, the core plate being substantially centrally disposed laterally in said body; and means for positioning and clamping said body and core plate whereby said cutting edges assume a selected inclination relative to said axis.

3. A tool as stated in claim 2 wherein said body is provided with annular side walls parallel to said core plate, said core plate is centrally apertured and said positioning means includes a pair of wedge shaped clamping disks having spaced parallel annular inner surfaces adapted to frictionally clamp said side walls.

References Cited in the file of this patent

UNITED STATES PATENTS

| Number | Name | Date |
|---|---|---|
| 45,677 | Rogers | Dec. 27, 1864 |
| 432,824 | Fox | July 22, 1890 |
| 447,716 | Fox | Mar. 3, 1891 |
| 1,434,421 | Arntz | Nov. 7, 1922 |
| 1,568,199 | Watson | Jan. 5, 1926 |
| 1,782,507 | Huther | Nov. 25, 1930 |
| 1,810,823 | Freas et al. | June 16, 1931 |
| 2,160,525 | Thornton | May 30, 1939 |